United States Patent
Ludwig

(10) Patent No.: US 11,460,367 B2
(45) Date of Patent: Oct. 4, 2022

(54) SUBSEA HOUSING ASSEMBLY

(71) Applicant: Siemens Energy AS, Oslo (NO)

(72) Inventor: Klaus Ludwig, Erlangen (DE)

(73) Assignee: Siemens Energy AS, Oslo (NO)

( * ) Notice: Subject to any disclaimer, the term of this patent is extended or adjusted under 35 U.S.C. 154(b) by 253 days.

(21) Appl. No.: 16/961,670

(22) PCT Filed: Dec. 6, 2018

(86) PCT No.: PCT/EP2018/083852
§ 371 (c)(1),
(2) Date: Jul. 11, 2020

(87) PCT Pub. No.: WO2019/141432
PCT Pub. Date: Jul. 25, 2019

(65) Prior Publication Data
US 2020/0400522 A1   Dec. 24, 2020

(30) Foreign Application Priority Data
Jan. 16, 2018   (EP) ..................................... 18151877

(51) Int. Cl.
*G01K 1/00* (2006.01)
*G01L 19/14* (2006.01)
(Continued)

(52) U.S. Cl.
CPC .............. *G01L 19/143* (2013.01); *G01K 1/08* (2013.01); *G01K 1/14* (2013.01); *G01K 13/02* (2013.01);
(Continued)

(58) Field of Classification Search
CPC ............ G01K 1/14; G01K 1/08; G01K 13/02; G01K 13/026; G01L 19/143
See application file for complete search history.

(56) References Cited

U.S. PATENT DOCUMENTS

| 5,052,941 A | 10/1991 | Hernandez-Marti et al. |
| 2009/0066535 A1* | 3/2009 | Patel .................... E21B 41/0035 |
| | | 340/853.2 |

(Continued)

FOREIGN PATENT DOCUMENTS

| EP | 3269921 A1 | 1/2018 |
| WO | 2014123425 A1 | 8/2014 |

(Continued)

OTHER PUBLICATIONS

PCT International Search Report and Written Opinion of International Searching Authority dated Feb. 22, 2019 corresponding to PCT International Application No. PCT/EP2018/083852 filed Dec. 6, 2018.

*Primary Examiner* — Jamel E Williams
(74) *Attorney, Agent, or Firm* — Wolter Van Dyke Davis, PLLC

(57) ABSTRACT

A subsea housing assembly has a subsea housing with first and second housing portions having first and second electrical connections for data communication with a separating wall. An inductive coupler has first and second coupling sections disposed in the first and second housing portions and provides inductive coupling across the wall for data communication between the first and second electrical connections. The inductive coupler has inner and outer coils. The outer coil at least partly surrounds the inner coil and at least part of the wall extends between the inner and outer coil. Soft magnetic material is arranged around the outer coil and/or inside the inner coil where magnetic flux is collected and guided from the outer to the inner coil and/or from the inner to the outer coil. A support structure is provided around and/or inside the part of the wall extending between the inner and outer coil.

21 Claims, 3 Drawing Sheets

(51) Int. Cl.
*G01K 1/08* (2021.01)
*G01K 1/14* (2021.01)
*G01K 13/02* (2021.01)
*G01L 19/06* (2006.01)
*H02J 50/10* (2016.01)

(52) U.S. Cl.
CPC ........ *G01L 19/0618* (2013.01); *G01K 13/026* (2021.01); *H02J 50/10* (2016.02)

(56) References Cited

U.S. PATENT DOCUMENTS

| | | | |
|---|---|---|---|
| 2011/0132215 A1* | 6/2011 | Bernard | B65H 45/28 101/217 |
| 2013/0118752 A1* | 5/2013 | Hannegan | E21B 33/143 166/336 |
| 2016/0004956 A1* | 1/2016 | Reynolds | G07C 3/00 377/15 |
| 2016/0024869 A1 | 1/2016 | Vachon et al. | |
| 2017/0074048 A1* | 3/2017 | Patel | E21B 17/003 |
| 2021/0018374 A1* | 1/2021 | Herceg | G01K 3/005 |

FOREIGN PATENT DOCUMENTS

| | | | | |
|---|---|---|---|---|
| WO | WO-2014123425 A1 * | 8/2014 | ........ | E21B 33/0385 |
| WO | 2015139953 A1 | 9/2015 | | |

\* cited by examiner

SUBSEA HOUSING ASSEMBLY

CROSS REFERENCE TO RELATED APPLICATIONS

This application is the US National Stage of International Application No. PCT/EP2018/083852 filed 6 Dec. 2018, and claims the benefit thereof. The International Application claims the benefit of European Application No. EP18151877 filed 16 Jan. 2018. All of the applications are incorporated by reference herein in their entirety.

FIELD OF INVENTION

The present invention relates to a subsea housing assembly and to a subsea sensor.

BACKGROUND

Subsea sensors such as temperature sensors or pressure sensors are essential components of any subsea processing facility. A subsea sensor may for example be mounted to a pipe section through which a process fluid flows, such as a gas, a liquid, or a multiphase fluid which can include gaseous, liquid and solid constituents. The process fluid pressure in some applications can be very high, for example in excess of 1,000 or 1,400 bar. While it is important for the process of extracting the process fluid to measure those high pressures with high accuracy it is similarly important to ensure that no process fluid leaks into the seawater under any circumstances.

European patent application EP 3269921 discusses a subsea housing assembly having a wall 30 providing a separation between a first housing portion 10 and a second housing portion 20 wherein a data communication is being provided between the first and second housing portions, through said wall, by way of inductive coupling 50. In one of the embodiments discussed in EP 3269921 the inductive coupling comprises an outer and an inner coil wherein the outer coil at least partly surrounds the inner coil and wherein at least part of the wall extends between the inner coil and the outer coil.

In co-pending European patent application entitled "Subsea housing assembly and subsea sensor" assigned to the same assignee and filed on the same day herewith an improvement of a subsea housing assembly and subsea sensor having such a coil arrangement is disclosed wherein soft magnetic material is arranged at least around the outer coil and/or inside the inner coil such that the magnetic flux is collected and guided from the outer coil to the inner coil and/or from the inner coil to the outer coil. An embodiment discussed in said application is shown in FIG. 4.

FIG. 4 is a schematic sectional view of an inductive coupler 50 comprising two coil systems A, B each comprising an inner coil 51A, 51B and an outer coil 52A, 52B. A two-part flux guide 53A, 53B is provided to bidirectionally guide the magnetic flux between coils 51, 52. The two sets of coils 51, 52 may be provided for redundancy and/or for providing separate paths for coupling into and out of the first housing portion 10. It should be noted that the smallest possible arrangement comprises only one coil set. The flux guide 53 is made of soft magnetic material and comprises two parts: an inner body 53A arranged inside the first housing portion 10 and an outer body 53B arranged inside the second housing portion 20.

As the wall section 30 serves as a secondary barrier between the process fluid and the environment it needs to be able to withstand the pressure difference between the fluid to which the sensor is exposed and the sensor's environment, and for testing purposes it needs to be able to reliably withstand at least 1.5 times that pressure difference, e.g. pressures of up to 1,500 or 2,100 bar or even 3,000 bar in typical subsea applications. The minimum thickness or strength of the wall section extending between the first and second coils must thus be chosen accordingly and will in many cases be in excess of 10 mm which adversely affects the efficiency of the electromagnetic coupling between the inner and outer coils.

It is an object of the present invention to provide a subsea housing assembly and a subsea sensor having an inductive coupling wherein the thickness or strength of the wall section extending between the first and second coils may be reduced below the required minimum thickness or strength while maintaining the safety of the secondary barrier.

SUMMARY

In accordance with one aspect of the present invention there is provided a subsea housing assembly comprising a subsea housing having a first and a second housing portion. The first housing portion comprises a first electrical connection for data communication and the second housing portion comprises a second electrical connection for data communication. A wall provides separation between the first housing portion and the second housing portion. The subsea housing assembly further comprises an inductive coupler comprising a first coupling section disposed in the first housing portion and a second coupling section disposed in the second housing portion. The inductive coupler is configured to provide inductive coupling across the wall for providing at least a data communication between the first electrical connection and the second electrical connection. The inductive coupler comprises an inner coil and an outer coil wherein the outer coil at least partly surrounds the inner coil and wherein at least part of the wall extends between the inner coil and the outer coil. Soft magnetic material is arranged at least around the outer coil and/or inside the inner coil such that the magnetic flux is collected and guided from the outer coil to the inner coil and/or from the inner coil to the outer coil. A support structure is provided around and/or inside the part of the wall extending between the inner coil and the outer coil.

In other words, in order to improve the performance of the inductive coupling, a flux guide made of soft magnetic material is provided, and a support structure is provided to ensure the overall mechanical integrity of the housing near and/or around the part of the wall extending between the coils so that a thickness of part of the wall extending between the coils may advantageously be chosen that in itself would not be sufficient to withstand the operating and/or test pressures discussed above.

By providing a subsea housing assembly with such inductive coupler, a data communication can be established through the wall of the subsea housing which allows for example a better sealing of the first housing portion. For example when used in a subsea sensor, the first housing portion may comprise the sensor element, and the wall may provide a fluid tight barrier for the process fluid so that the fluid may be confined to within the first housing portion. The support structure and the wall in combination may be configured to provide a pressure barrier for the process fluid pressure so that the pressure may be confined to within the first housing portion. The data communication may for example include a communication of analog or digital sensor values or readings, it may for example include raw or processed sensor data.

By providing the inductive coupler, it is not necessary to provide glass penetrators including a glass to metal sealing. Accordingly, problems associated with large pressure differences across such penetrators and reduced insulation resistance of such penetrators may be avoided. The risk of a leakage may thus be reduced. Furthermore, since the separation is provided by the wall, and no penetrator is required, the testing standard may only require lower test pressures, thus facilitating the meeting of the specifications by a respective device comprising such subsea housing assembly.

In an embodiment the wall and the support structure in combination form a pressure barrier configured to resist a predetermined minimum pressure difference across the wall.

In an embodiment the inductive coupler may further be configured to inductively supply electrical power from the electrical connection in the second housing portion to the electrical connection in the first housing portion. As an example, the coil in the second housing section may be driven by an AC current that can be modulated for data communication. The resulting electromagnetic field can induce a current in the coil of the first coupling section in the first housing portion. Electrical power and data communication signals (which may include control signals) may thus be transferred into the first housing portion. Similarly, a modulated current may be provided to the coil of the first coupling section, which induces a respective current in the second coupling section, for example for transferring sensor data or the like.

In an embodiment the wall is made of a non-magnetic material, advantageously a non-magnetic metal such as Iconel 625. In that case the barrier provided by the first housing portion and the wall does not include any non-metallic parts. By providing a subsea housing assembly with an inductive coupler and a metal wall, a data communication can be established through the wall of the subsea housing without using conventional glass penetrators which require a glass to metal sealing and, as briefly discussed above, need to be tested at 2.5 times the operating pressure, requiring the entire sensor to be designed to reliably withstand 2.5 times the operating pressure. With an inductive coupler it should be possible to test at only 1.5 times the operating pressure thereby reducing the design and testing requirements considerably. Additionally, problems associated with the manufacture of glass to metal junctions may be avoided.

In an embodiment the support structure is also made of a non-magnetic material, advantageously a non-magnetic metal such as Iconel 625 and most advantageously made of the same material as the wall so as to avoid electrochemical corrosion between at the support structure's mounting points, and to avoid or reduce electromagnetic losses in the support structure.

The soft magnetic material serving as a flux guide may form an inner body that is enclosed by the inner coil and/or an outer body enclosing the outer coil so as to capture as much of the magnetic flux generated by the respective coil as possible. Advantageous embodiments may comprise both an inner and an outer body made of soft magnetic material which when assembled forms a body enclosing both coils in length and diameter and advantageously extending beyond the length of the coils. Advantageously the outer body is essentially a two-part cylindrical cap covering the outer coil whereas the inner body is cylindrical body fully filling the inner coil. In alternative embodiments the inner body may comprise an axial bore and/or be provided in the form of a hollow cylinder.

In an embodiment, the wall is integrally formed with a first housing body of the first housing portion. The first housing body may for example be shaped like a metal canister having an opening through which part of a sensor extends and that is sealed to a metal body, such as a pipe section or the like (where the subsea sensor is installed). The first housing body may be a single piece metal body, supplemented by the support structure.

In other embodiments, the first housing portion may comprise a plurality of housing parts, and the housing parts may advantageously be sealed to each other by metal seals. It is noted that the expression "single piece metal body" is not meant to be understood in that the housing portion cannot comprise further elements mounted to such single piece metal body. What is meant is that the part of the first housing portion that includes the wall providing the second liquid tight barrier and that is sealed to, e.g., a pipe section (or another part of the first housing portion) is formed integrally from a single piece of material. By combining wall and support structure a safe and reliable second pressure barrier within the subsea housing assembly may thus be obtained which may be capable of withstanding large to very large pressure differences such as between the process fluid pressure and the surrounding ambient pressure.

In accordance with another aspect of the present invention there is provided a subsea sensor comprising a subsea housing assembly according to the present invention and further comprising a sensor element disposed in the first housing portion, wherein the first electrical connection is configured for providing communication with the sensor element, and wherein the second electrical connection is configured to provide at least a sensor output of the subsea sensor.

In some configurations, a single electrical line may be provided for power supply and data communication, for example by providing a respective modulation on the power line. In other embodiments, separate lines may be provided and may be part of the respective electrical connection, for example dedicated lines for power supply and data communication. In some embodiments, the sensor may only be a passive sensor, and only the electrical power required to read such passive sensor may be transmitted by means of the inductive coupler. In other applications, further electric and/or electronic components may be provided in the first housing portion, for example for operating the sensor element or processing sensor data. The inductive coupler advantageously comprises first and second coupling sections which provide both inductive coupling for data communication and power transfer. In other embodiments, the inductive coupler may comprise further coupling sections, for example for separately transferring electrical power and communication signals.

The first housing portion may for example comprise a sensor assembly including diaphragms, such as a process diaphragm and a sensor diaphragm, a sensor element, medium filled channels or the like and may further include a first pressure barrier that provides separation between the pressure prevailing in such medium filled channels and the first chamber. As an example, a process diaphragm may transmit the pressure of the process fluid to such medium (e.g. oil) present in the channels, which in turn applies the pressure to a sensor element. Accordingly, if such first pressure barrier fails, and process fluid or process fluid pressure is transmitted into the first chamber, such fluid/ pressure can be confined to within the first housing portion by means of wall and support structure, which in combination constitute a second pressure barrier.

The first housing portion may be sealed against a metal body by means of a metal seal, in particular a metal gasket. As an example, the subsea housing assembly may be part of a subsea sensor, and the first housing portion may be sealed against a pipe section, for example a pipeline section or a flow duct in a Christmas tree or the like. The first housing portion may comprise a mounting flange for mounting the subsea housing assembly to such metal body.

DETAILED DESCRIPTION

Figure 1:
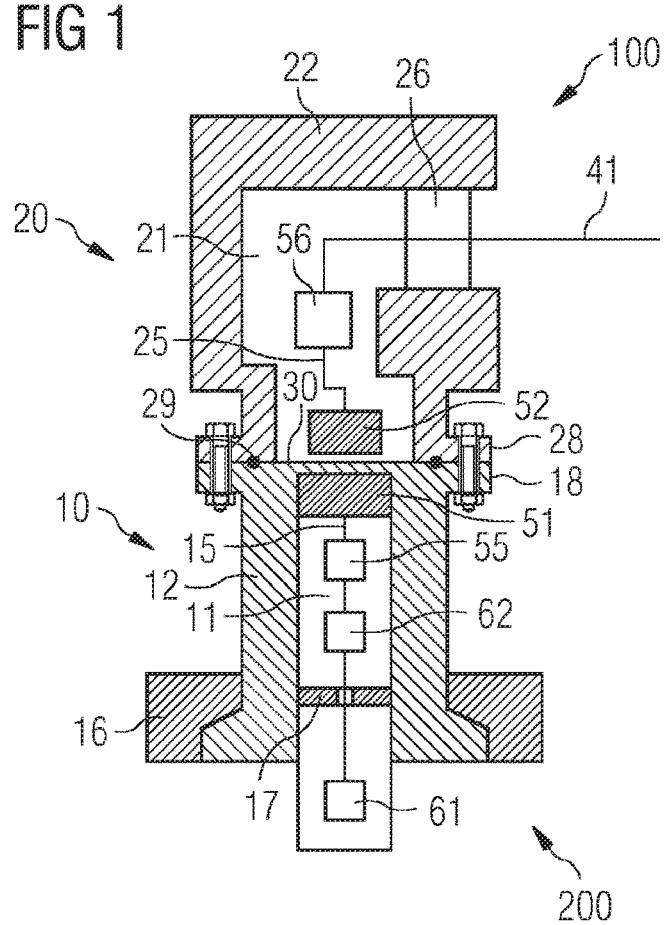
FIG. 1 is a schematic diagram showing a subsea housing assembly and a subsea sensor.

Referring to FIG. 1 there is shown a schematic drawing showing a subsea housing assembly 100 that is part of a subsea sensor 200. The subsea housing assembly 100 includes a first housing portion 10 and a second housing portion 20. The first housing portion 10 includes a first housing body 12 and a first chamber 11. The second housing portion 20 includes a second housing body 22 and a second chamber 21. The first and second housing bodies 12, 22 include flanges 18, 28, respectively, by means of which they are fixedly attached to each other. In the present example, both housing portions are bolted together.

The first housing body 12 substantially surrounds the first chamber 11. In particular, the first housing portion 10 includes a wall 30 that provides a pressure barrier. This allows application of a high pressure difference across the walls of the first housing body 12. The wall 30 provides separation between the first chamber 11 and the second chamber 21. Accordingly, a safe and reliable sealing can be provided between the first and second chambers 11, 21 that is capable of withstanding high pressure differences, for example in excess of 1,000 or even 2,000 bar.

At the other end, the first housing portion 10 may simply be closed, for example by means of a closing plate or the like. Such configuration may be employed when the subsea housing assembly 100 is used for a subsea canister, such as a subsea electronic canister or a control canister or control module. In the embodiment of FIG. 1, the subsea housing assembly 100 is used for a subsea sensor 200 and a first pressure barrier 17 is provided in the first housing portion 10. The first pressure barrier 17 provides sealing of the first chamber 11 towards a part of the first housing portion 10 in which a sensor element 61 is located and exposed to high pressures, such as the high pressure of a process fluid. Note that such exposure may be a direct exposure, or an indirect exposure, for example via a respective process diaphragm and a pressure transmission fluid such as oil or the like.

When embodied as subsea sensor as shown in FIG. 1, the first chamber 11 may comprise sensor electronics 62, such as control electronics, data processing electronics and the like. The first chamber 11 may be a pressure resistant chamber in which a predefined pressure is maintained, even when the subsea housing assembly 100 is installed at a subsea location. Such pressure may be a pressure below 10 bar and it may advantageously be a pressure below 5 bar, or even below 1.5 bar. A close to atmospheric pressure may prevail in the first chamber 11, which may thus be termed an atmospheric chamber. Chamber 11 may be filled with a gas, such as nitrogen, or a gas mixture, such as air or a mixture of nitrogen with other gasses. It may thus be possible to operate conventional electric and electronic components within chamber 11.

Accordingly, in the configuration of the subsea housing assembly as illustrated in FIG. 1, high pressures, such as of a process fluid, can effectively be confined to within the first chamber 11 even if the first pressure barrier 17 fails. The first pressure barrier 17 may for example comprise a feed through for an electric connection to the sensor element 61, or the sensor element 61 may itself be configured so as to constitute a pressure barrier. Under certain conditions, such pressure barrier may fail, thus allowing high pressure fluid to enter chamber 11. A prior art wall 30 must often be constructed such that it provides a second barrier so that the pressure can be confined effectively within the first housing portion 10.

For providing a data communication with an electronic component within the first housing portion 10, an inductive coupler 50 comprising a first coupling section 51 and a second coupling section 52 is provided. The inductive coupler and the wall section through which the coupling is effected are shown in FIG. 1 in terms of functional blocks only and will be explained in more detail below with reference to FIGS. 4 and 5.

The first coupling section 51 is disposed in the first chamber 11 and connected to an electrical connection 15 that provides at least data communication, in particular with the sensor element 61 or the sensor electronics 62 in the example of FIG. 1. The second coupling section 52 is disposed in the second chamber 21 and is connected to a second electrical connection 25 in the second housing portion 20. The inductive coupler 50 provides at least data communication between the first and second electrical connections 15, 25 across the wall 30. Besides transmitting data communications, the coupler 50 may also be configured to transfer power from the electrical connection 25 to the electrical connection 15.

The first and second coupling sections 51, 52 are implemented as coils the arrangement of which will be shown below with reference to FIGS. 4 and 5. An alternating current (AC) provided to the second coupling section 52 may for example create a alternating magnetic field which in turn induces a current in the first coupling section 51 which then may be used to provide electric power to electric and electronic components comprised in the first housing portion 10 including sensor electronics 62 and sensor element 61. For data transmission, modulation may be provided. As an example, the current applied to the coil 52 may be modulated, and such modulation will lead to a modulation of the current induced in the first coupling section 51. For this purpose, a receiver/transmitter 56 may be provided in the second housing portion 20 and can be coupled to the second electrical connection 25. Unit 56 can include a receiver and a transmitter, and it may modulate control signals received on line 41 for transmission via the inductive coupler 50, and it may demodulate signals received from the second coupling section 52 for further transmission via the line 41. Note that the transmitter/receiver 56 may also be located at a different position, for example at the other end of line 41, at a topside location or at a subsea data processing center.

Similarly, a transmitter/receiver 55 is provided in the first housing portion 10 in chamber 11 and is connected to the first electrical connection 15 and the first coupling section 51. Unit 55 may for example detect a modulation of a current received from the first coupling section 51 and may provide corresponding control signals to the sensor electronics 62. Unit 55 may further receive sensor data from the sensor electronics 62 and may modulate such sensor data onto a signal that is provided to the first coupling section 51, so that an alternative magnetic field is created which is coupled to second coupling section 52 and induces a current therein that is detected and demodulated by transmitter/receiver unit 56. Accordingly, data recorded by the sensor element 61 can be communicated on line 41 without requiring electric wires penetrating wall 30 which provides the secondary pressure barrier.

As a minimum configuration, inductive coupler 50 comprises one first coupling section and one second coupling section. In embodiments, such as those shown in FIGS. 4 and 5, inductive coupler 50 may comprise plural coupling sections, for example some dedicated to the transfer of electrical power and others dedicated to the transfer of data communications so as to provide multiple coupling paths to avoid signal degradation by magnetic interference of the inbound and the outbound signal and/or power transmission.

As the pressure is confined to within the first housing portion 10, in the prior art by means of wall 30 alone, the sealing of the second housing portion 20 is facilitated. In particular, the second chamber 21 can be a pressure compensated chamber the pressure of which is balanced to the surrounding ambient pressure, in particular the subsea pressure when the housing assembly 100 is installed subsea. The differential pressure across the walls of the second housing body 22 is accordingly relatively low. In the example of FIG. 1, the housing body 22 has an opening in which the second coupling section 52 is located. This opening is sealed against the first housing body 12, for example by means of O-ring seals 29. Double seals are advantageously provided.

The second chamber 21 may be filled with a substantially incompressible medium, in particular a dielectric liquid or gel, such as oil or the like. The electric and electronic components of unit 56 may be adapted to operate in such environment, or, as mentioned above, unit 56 may be located outside the chamber 21, for example in a subsea canister to which the sensor 200 is connected, or at a topside location. Pressure compensation may occur by means of a dedicated pressure compensator forming part of the subsea housing assembly 100 (not shown). In other embodiments, the subsea housing assembly 100 may be connected to a subsea cable in the form of an oil filled hose, wherein the inner volume of such hose is filled with a dielectric liquid (in particular oil) and is pressure compensated against the ambient environment due to the flexibility of the hose. Pressure compensation of the second chamber 21 can occur via such hose, for example by allowing a flow communication through the opening 26 between the inner volume of the hose and the chamber 21, or by providing some pressure transmitting element in the opening, such as a membrane or bellows.

In other configurations the second chamber 21 may be a pressure resistant chamber. As an example, a predefined pressure below 10 bar, advantageously below 5 bar or below 1.5 bar, such as close to atmospheric pressure may be maintained in chamber 21. For this purpose, a penetrator providing a pressure barrier can be provided in the opening 26. Since such penetrator has to withstand the differential pressure between the interior pressure of chamber 21 and the external subsea pressure when installed subsea, the pressure difference is relatively low compared to the pressure difference that can prevail when a barrier is exposed to the pressure of process fluid, such as the barrier provided by wall 30.

The second housing portion 20 may for example comprise a fitting or connector for providing a connection to a subsea cable. In other configurations, a further unit, such as a control module or the like, may be mounted directly to the subsea housing assembly 100.

By providing the inductive coupler 50, problems related to insulation resistance that occur with conventional glass penetrators may be overcome. In particular, the insulation resistance would in such a case be measured between the metal cage provided by the first and second housing bodies 12, 22 and the respective coupling section 51, 52, so that insulation resistance can be kept high. In particular, since no glass penetrators are used, the insulation resistance can also be maintained during high pressure testing.

Figure 2:
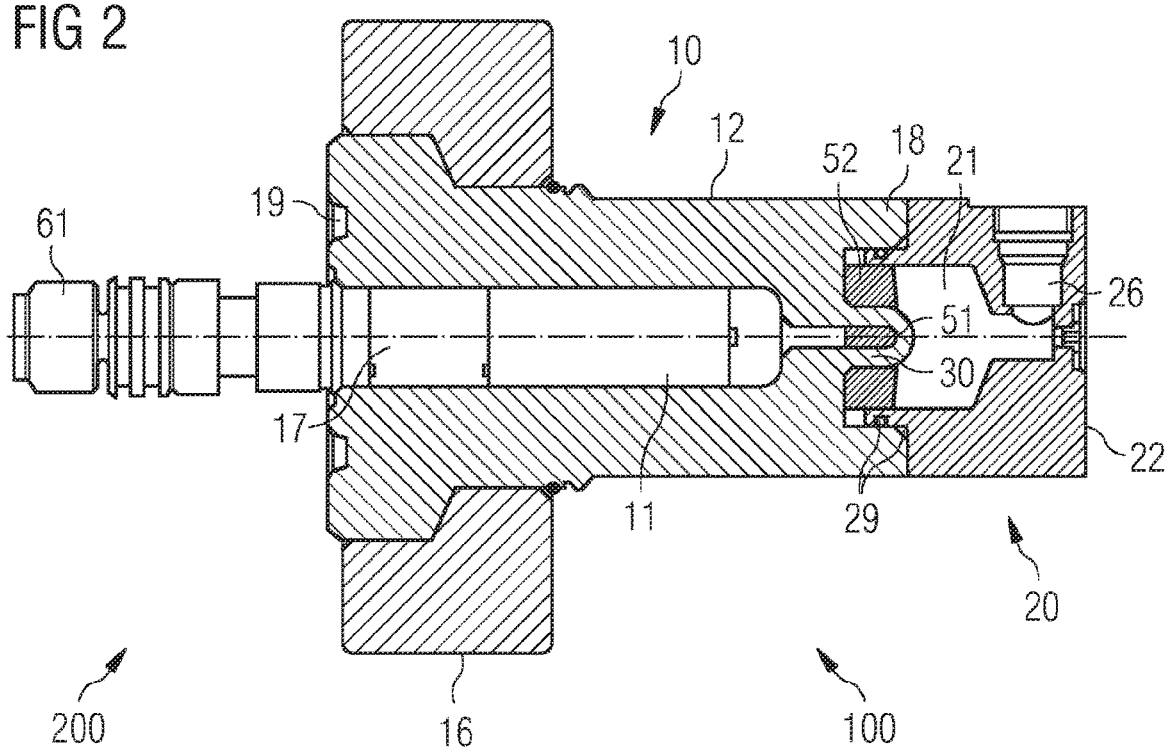
FIG. 2 is a schematic diagram showing a subsea sensor comprising a subsea housing assembly having an inductive coupler comprising an outer and an inner coil wherein the outer coil at least partly surrounds the inner coil and wherein at least part of the wall extends between the inner coil and the outer coil as discussed in EP 3269921.

FIG. 2 illustrates a subsea housing assembly 100 wherein the inductive coupler comprises an outer and an inner coil wherein the outer coil at least partly surrounds the inner coil and wherein at least part of the wall extends between the inner coil and the outer coil as discussed in EP 3269921. The explanations given above with respect to FIG. 1 are equally applicable to FIG. 2, and only the differences are explained in more detail hereinafter.

In FIG. 2, the first housing portion 10 is provided with a seal 19 for sealing against a subsea device, in particular a metal body, such as a pipe section. The seal 19 is advantageously provided in form of a metal seal, in particular a metal gasket.

In FIG. 2, the first coupling section 51 is provided in the form of an inner coil, and the second coupling section 52 is provided in the form of an outer coil that extends around the inner coil. The coils are arranged coaxially. The wall 30 extends between the first and second coupling sections 51, 52. Accordingly, in the example of FIG. 2, the wall 30 is curved and extends around the inner coil. Wall 30 is formed integrally with the first housing body 12 of the first housing portion 10. By such configuration, a more efficient transfer of data communication and electrical power may be achieved while maintaining an effective and secure pressure barrier between the first and second chambers 11, 21.

In FIG. 2, the second housing body 22 has a smaller diameter portion that is attached to a larger diameter portion (flange 18) of the first housing body 12. As an example, the second housing body 22 may be screwed into the first housing body 12. Between both housing bodies, seals 29 are provided, which can be in the form of elastomeric or metal O-ring seals. The opening 26 has the form of a fitting, into which the end of a subsea cable such as an oil filled hose can be screwed or otherwise be attached. As an example, it may be an MKII fitting. A mounting flange 16 is provided for mounting the subsea housing assembly 100 to the other subsea device, in particular pipe section.

In FIG. 2, the electrical connections 15, 25 as well as other electrical and electronic components discussed herein are omitted solely for the purpose of a less complex drawing and may be present in the various embodiments of the present invention.

Figure 3:
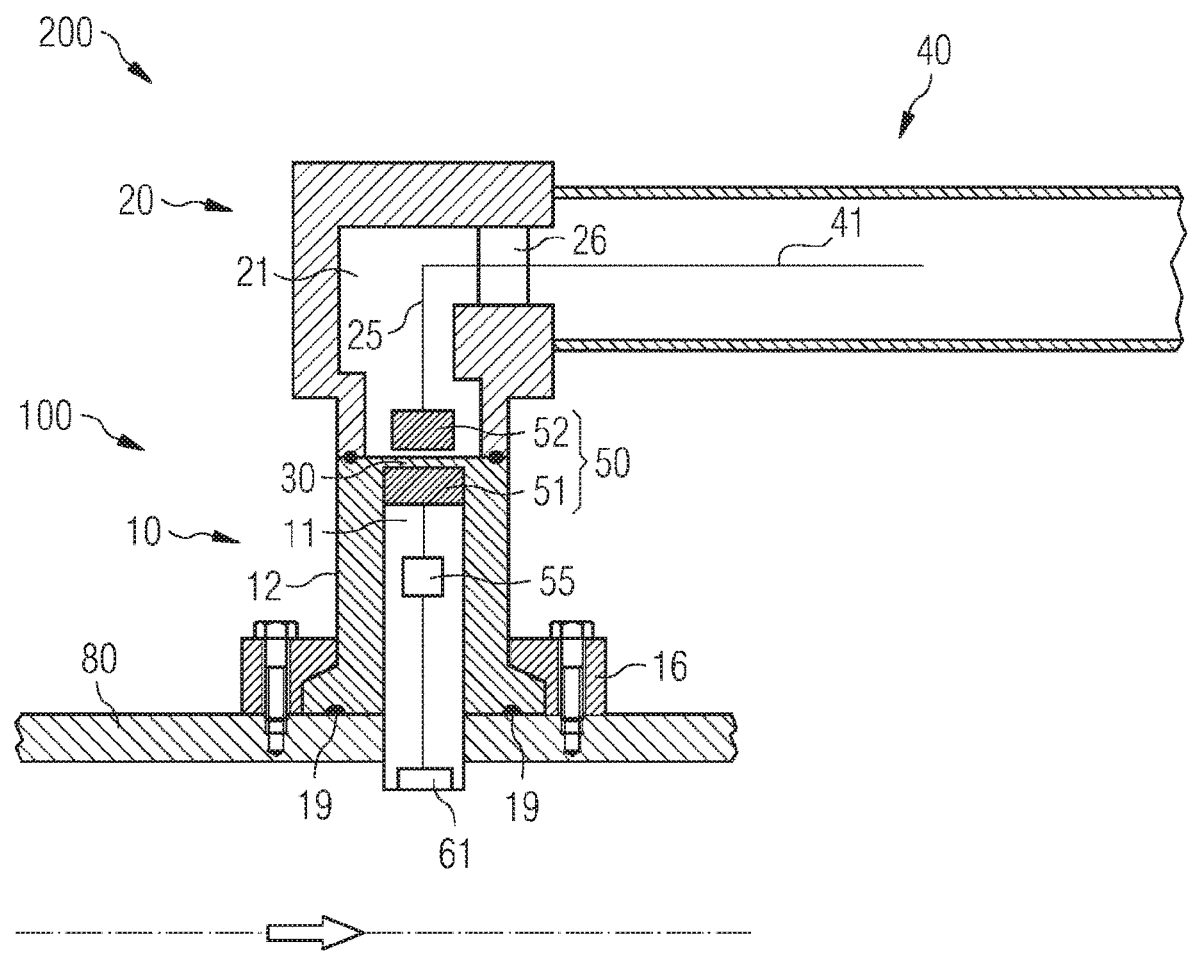
FIG. 3 is a schematic diagram showing a subsea housing assembly mounted to a pipe section.

In FIG. 3, an embodiment of a subsea housing assembly 100 that is part of an embodiment of a subsea sensor 200 is illustrated. The explanations provided above and below with respect to FIGS. 1, 2, 4 and 5 are equally applicable to the embodiment of FIG. 3. In FIG. 3, the subsea housing assembly 100 is mounted to a subsea pipe 80 through which a process fluid flows. As shown the first housing body 12 is pressed against the subsea pipe 80 by means of the mounting flange 16 and sealed by means of the seal 19 which may for example be a metal gasket. Note that two seals 19 may be provided to provide a double barrier.

Sensor element 61 may for example measure temperature and/or pressure of the process fluid flowing through the pipe section 80, and respective readings may be modulated and transmitted by the transmitter/receiver 55 via the inductive coupler 50, which again is shown in terms of functional blocks only and will be explained in more detail below with reference to FIGS. 4 and 5.

To the port opening 26 of the second housing portion 20, a subsea cable in form of an oil filled hose 40 is mounted. Note that the subsea cable may form part of the subsea sensor 200 and that a (wet mate or dry mate) connector may be provided at the other end of the subsea cable 40 for connecting the sensor 200 to another subsea device or to a topside installation. In the example of FIG. 3 line 41 of subsea cable 40 is directly connected to electrical connection 25 and second coupling section 52. In other embodiments further electric and electronic components such as the transmitting/receiving unit 56 may be provided. Again, it is noted that the opening 26 may in some embodiments allow a flow communication between the interior of subsea cable 40 and the second chamber 21, while in other embodiments, separation may be provided. Such separation can be provided by a pressure transmitting element such as a membrane, or by means of a penetrator which allows the maintaining of a pressure difference across the opening 26.

Figure 4:
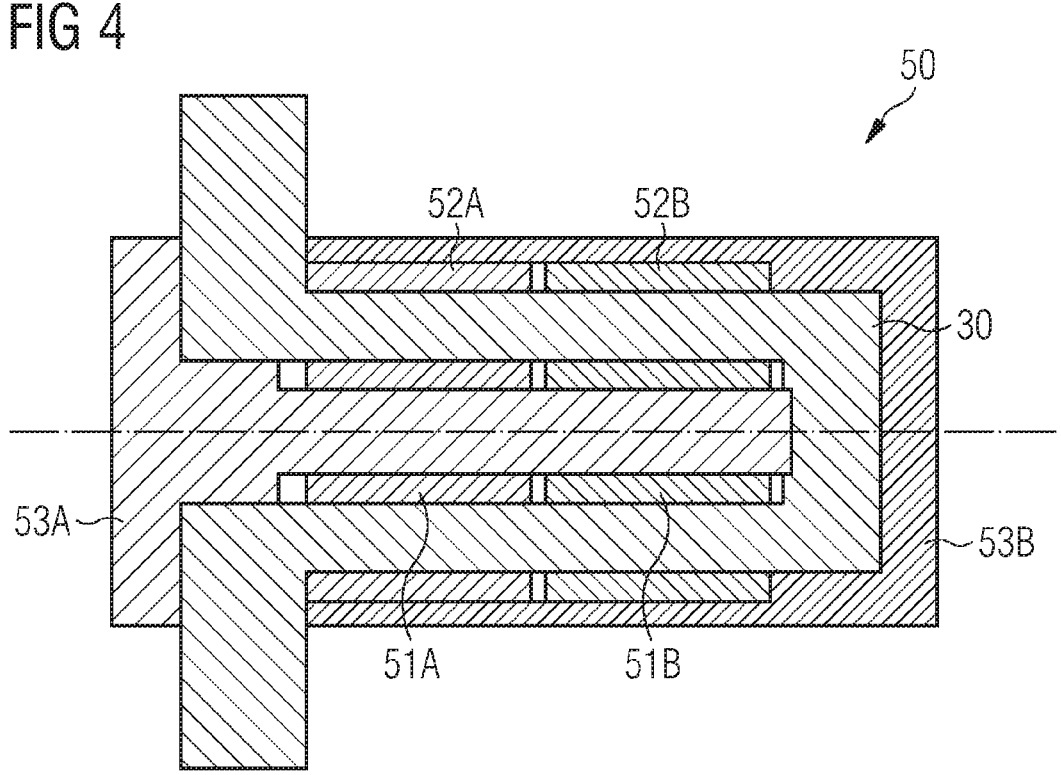
FIG. 4 is a detailed schematic sectional view of an inductive coupler as discussed in the co-pending European patent application referred to above.

FIG. 4 shows an improvement to the inductive coupler discussed in EP 3269921. A two-part flux guide 53A, 53B is provided to bidirectionally guide the magnetic flux between the coils 51, 52. In an embodiment the flux guide is made from a soft magnetic material such as a ferrite. Note that FIG. 4 does not show the smallest possible arrangement comprising one first coil 51 arranged inside the first housing portion 10 and one second coil arranged inside the second housing portion 20. Instead FIG. 4 shows an arrangement wherein two sets A, B of coils 51, 52 are provided for redundancy and/or to provide separate paths for coupling into and out of the first housing portion 10. The following discussion is independent on the number of coil sets which may of course exceed 2 as will be readily apparent to those with skills in the art.

The flux guide 53 shown in FIG. 4 is made of soft magnetic material and comprises two parts: an inner body 53A arranged inside the first housing portion 10 and an outer body 53B arranged inside the second housing portion 20. Almost any shape of inner and outer body 53, alone and in combination, will improve the performance of the magnetic coupling 50 as long as such body is arranged near one of the coils 51, 52.

In FIG. 4, both bodies are present and formed and arranged such that when assembled they form an overall body enclosing both coils in length and diameter. Advantageously the outer body 53B is essentially a cylindrical cap or dome covering both the outer coil 52 and the wall section 30 extending between the coils 51, 52 whereas the inner body 53A is a cylindrical body, fully filling the inner coil 51 and the inside of the wall section 30, the inner body 53A further comprising a cylindrical base which at least has approximately the same diameter as the outer body's cylindrical cap or dome. In alternative embodiments the inner body may have an axial bore and/or be provided in the form of a hollow cylinder so as to reduce its weight and/or cost and/or to reduce the amount of magnetic field near the inner body's axis.

Advantageously there is only a small or no air gap between wall 30, inner coil 51 and inner body 53A and between wall 30, the outer coil 52 and the outer body 53B. In this embodiment it is assumed that the wall section 30 extending between the coils 51, 52 is cylindrical or dome shaped, as for example discussed with reference to FIG. 2. Other shapes of the wall section (such as essentially cuboid) may also be implemented. In that respect FIGS. 4 and 5 are schematic and the references to cylindrical or annular shapes herein are merely examples.

In FIG. 4, the key design parameter is the thickness or strength of wall section 30 extending between the first and second coils, the selection of which is dictated by the overall design and purpose of the housing assembly. As discussed above the wall section 30 by itself conventionally serves as a second barrier and needs to be able to withstand the pressure difference between the fluid to which the sensor is exposed and the sensor's environment. For testing purposes it needs to be able to reliably withstand at least 1.5 times that pressure difference, e.g. pressures of up to 1,500 or 2,100 bar or even 3,000 bar in typical subsea applications. In practice, when designing the inductive coupler 50 in accordance with the teachings of the co-pending European patent application referenced above, the thickness or strength of wall section 30 extending between the first and second coils will be chosen first and depends on the maximum test pressure and the material chosen for wall 30.

Because the wall thickness will be considerable in a subsea application the transmission loss will be high and needs to be taken into consideration for coupling power into the first housing portion 10: the power requirements of the circuitry inside first housing portion will be an important design criterion for the inductance and thus the dimensions of the coil and the dimensions of the flux guide.

Figure 5:
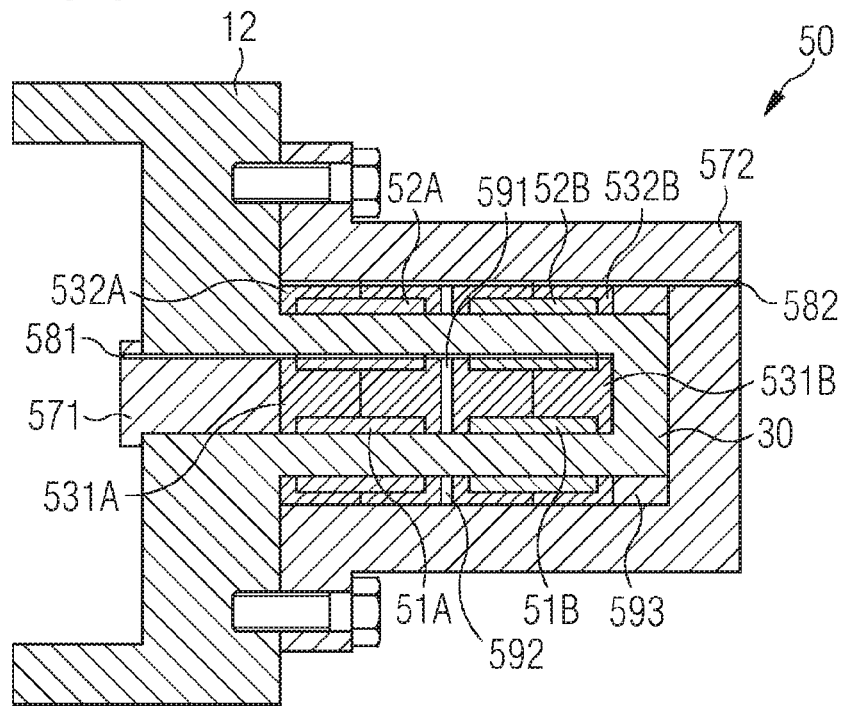
FIG. 5 is a detailed schematic sectional view of an inductive coupler in accordance with the present invention.

An improvement to the arrangement shown in FIG. 4 is shown in FIG. 5. The explanations given above with respect to FIGS. 1, 2, 3 and 4 are equally applicable to FIG. 5, and only the differences and improvements are explained in more detail hereinafter. As discussed above, the loss in transmission efficiency caused the thickness of the part of the wall extending between the coils or coil systems 51, 52 will be considerable and it is therefore desirable to reduce the thickness. Conventionally the thickness of the part of the wall extending between the coils is lower bounded by the mechanical requirements but in accordance with the present invention may be reduced below the lower bound by structurally supporting the part of the wall extending between the coils.

In the embodiment of the present invention shown in FIG. 5 the inductive coupler 50 comprises two coil sets denoted by suffixes A, B, respectively. As discussed above, in other embodiments there may only be one coil set and in yet other embodiments there may be more than two coils sets.

The first coupling section 51A of the first coil set A is provided in the form of an inner coil, and the second coupling section 52A of the first coil set A is provided in the form of an outer coil that extends around the inner coil. Both coils are advantageously arranged coaxially. Similarly, a first coupling section 51B of the second coil set B is provided in the form of an inner coil, and the second coupling section 52B of the second coil set B is provided in the form of an outer coil that extends around the respective inner coil. A part of the wall 30 extends between the first and second coupling sections 51A, 52A, 51B, 52B. Accordingly, in the example of FIG. 5, the wall 30 has a cylindrical or pot-shaped extension and extends around the inner coil or coils. Wall 30 and its extension are advantageously formed integrally with the first housing body 12 of the first housing portion 10.

In the embodiment of FIG. 5 there is provided one flux guide arrangement per coil set A, B. A first flux guide arrangement 531A, 532A is arranged such that it facilitates the magnetic flux of the first coil system A and comprises an inner body 531A and an outer body 532A. As discussed with reference to FIG. 4, in this embodiment both bodies are present and formed and arranged such that when assembled they form an overall body which, in conjunction with the section of the wall extending between the inner and outer coils, encloses both coils in length and diameter.

For easy assembly and manufacture both the inner and the outer body of the flux guide arrangement may be constructed from two identical half-bodies.

The half-bodies forming the outer body 532A are essentially hollow cylinders with an inner diameter designed to accept the outer coil with as little air gap as possible between the outer circumference of the outer coil and the inner circumference of the half-body of the outer body. At one end the outer half-body may have a cylindrical base having a smaller inner diameter chosen such that the half-body can be installed on the cylindrical extension of wall 30 with a small or no air gap. The outer diameter of the half-body is chosen such that an outer support structure 572 can be fitted over the outer body with a small or no air gap.

The outer portion of the first coil set may then be assembled by first placing the first half-body of the outer body, base first, on the wall extension, then placing the outer coil on the wall extension and to about half of its length inside the first half-body, and then placing the second half-body of the outer body over the other half of the coil. Thereby the outer coil is, on the outside, completely encapsulated by the outer body 532A while resting on the wall extension on the inside.

The inner half-bodies are essentially full cylinders having an outer diameter designed such that the inner coils can be installed on the half body. At one end the inner half-body may have a cylindrical base having a larger outer diameter chosen such that the half-body can be installed inside the cylindrical extension of the wall with only a small or no air gap at the base.

The inner portion of the coil set may then be assembled by first placing the first half-body of the inner body, base first, inside the wall extension, then placing the inner coil to about half of its length inside the first half-body, and then placing the second half-body of the inner body inside the wall extension and over the other half of the coil. Thereby the inner coil is, on the inside, completely encapsulated by the inner half-body while the inner coil's outside rests inside or against the wall extension.

In advantageous embodiments, the outer half-bodies may also described as bodies that were obtained by rotating an "L" shape whereas the inner half-bodies may also be described as bodies that were obtained by rotating a "T" shape.

The second, optional, coil set B is constructed and installed in a similar fashion as described with reference to the first coil set above. In particular, the construction of coil set B may be identical to that of coil set A thereby reducing the manufacturing cost by reducing the amount of individual parts. It is however not necessary construct both coil sets with the same dimensions. For example, the longitudinal extensions of the coil sets A, B may be different, or the diameters of the coils and flux guide portions and the wall section may be different for the two coil systems, or the coil wiring may be different.

Advantageously the coils 51A, 51B, 52A, 52B are arranged concentrically or coaxially. More advantageously the coils forming one coil set, for example coils 51A, 52A, and the respective flux guides 531A, 532A for the first coil set A, are (with respect to the extension of the wall 30) longitudinally aligned as shown in the cross-sectional view in FIG. 5 so as to maximize the symmetry thereby optimizing the magnetic field line paths emanating at the ends of the coils.

As discussed above the wall thickness of the cylindrical extension of wall 30 may be chosen to be less than the minimum value required to ensure its functioning as second pressure barrier. In embodiments of the present invention it may be sufficient to design the extension of wall 30 such that it acts as a fluid-tight barrier having a thickness of less than 10 mm, advantageously 5 mm or less, while the structural stability of the wall section that extends between the coils is ensured by a support structure which in this embodiment comprises an inner support structure 571 and an outer support structure 572.

The inner support structure may be provided in the form of a full cylinder that fits inside the cylindrical wall extension and extends longitudinally so as to also support, or hold in place, the coil/flux body arrangement inside the cylindrical wall extension. The inner support structure 571 may comprise a cylindrical base having a larger diameter to increase its stability and to limit the amount of penetration into the cylindrical wall extension. The inner support may for example be a bolt that is held in place by form fit or friction fit or a combination thereof.

The outer support structure 572 may be in the form of a cylindrical cap or dome fully enclosing the wall extension and the coil/flux body arrangement arranged on the outside of the wall extension. The outer support structure may comprise a cylindrical base or flanges for fixing the outer support structure to the first housing body 12 and/or the wall 30.

Inner support structure 571 may comprise one or more thin channels 581 wherein the wires to and from the inner coils 51A, 51B run. Likewise, the outer support structure 572 may comprise one or more thin channels 582 wherein the wires to and from the outer coils 52A, 52B run. Additionally, these channels may be used to inject mold and release air to allow moldflow. These thin channels do not affect the mechanical stability of the inner support structure much.

Although process fluid may enter the thin channel opening towards the first chamber 11 if the first barrier breaks the force exerted by the process fluid inside the thin channel (having a small cross-sectional area) will be small and thus the channels can be reliably sealed by relatively thin end walls (not shown).

Once installed either or both channels 581, 582 may be filled with a mold so as to prevent the process fluid from entering if the first barrier breaks.

Similarly, any gaps and/or openings that remain within the inductive coupler 50 to facilitate the manufacturing process and/or to facilitate different thermal expansion behaviors of the different components may be filled with a mold, advantageously an elastic mold, at the end of the assembly process.

It should be noted that other shapes of the wall section extending between the coils (such as essentially cuboid) may also be implemented. In that respect FIGS. 4 and 5 are schematic and the references to cylindrical or annular shapes herein are merely examples. It will be readily apparent to those with skills in the art how to adapt the shapes discussed herein to accommodate such other shapes.

The section of the wall 30 extending between the first and second coils advantageously extends or protrudes into the second chamber 21 enough to allow a complete overlap between the coils 51, 52, including all coils if there are several as in the embodiment of FIG. 5, and more advantageously it extends into the second chamber enough so as to allow, for all coil sets, the alignment described above.

In order to increase the structural stability support discs 591, 592, 593 may be installed. For example, a support disc arrangement 591, 592 may be installed between the two coil sets A, B such that an inner support disc 591 is arranged between the inner flux guide body 531A of the first coil arrangement and the inner flux guide body 531B of the second coil arrangement. An outer support disc 592 is arranged between the outer flux guide body 532A of the first coil arrangement and the outer flux guide body 532B of the second coil arrangement. The discs 591, 592 are advantageously concentric and longitudinally aligned along the wall extension.

The inner support disc 591 is advantageously fitted inside the cylindrical wall extension with little or no air gap. Likewise, outer support disc 592 is advantageously fitted onto the cylindrical wall extension with little or no air gap and inside the outer support structure 572 with little or no air gap. The disc arrangement 591, 592 (particularly outer disc 592) may be designed to couple expansion forces from the inside of the wall extension to the outer support structure, and it may further be designed to exert predefined compression forces from the outer support structure to the wall extension wherein the inner support disc 591 absorbs these forces in order to avoid deformation of the wall extension.

In an embodiment, at least one set of support discs 591, 592 are arranged between the coil systems A and B and are advantageously made of a material that also acts as an electromagnetic shield so as to dampen the cross-coupling between the coil systems. In other words, electromagnetic shielding structures may be provided between the coil systems A and B, for example in the form of discs 591, 592 which additionally provide a mechanical support.

A third disc 593 is shown to be installed at the outer end of the cylindrical wall extension to provide a coupling fit between the wall extension and the outer support structure. Instead of a third disc the outer support structure may simply comprise a section with a reduced inner diameter for accommodating the cylindrical wall extension (i.e. have an integrated disc).

The support discs 591, 592, 593 may have small through holes so that the thin channels 581, 582 may extend beyond the support discs.

It should be noted that the embodiments are described herein such that the wall section extending between the inner coil and the outer coil extends from the first chamber 11 wherein electric and/or electronic components associated with the sensing element are disposed into the second chamber 21 wherein electric and/or electronic components associated with the signal processing and/or onward signal propagation are disposed. This is of course not meant to be limiting. The wall section 30 extending between the inner coil and the outer coil may in other embodiments extend from the second chamber 21 into the first chamber 11.

Providing two sets of coils as shown in FIGS. 4 and 5 provides a variety of design choices. For example distinct paths (and adapted coil sets) may be provided for transmitting power and/or control data into the first chamber and/or for transmitting sensor data out of the first chamber. In other embodiments the second coil set may be provided as a redundancy measure, noting that subsea sensors typically need to be designed for extremely long lifetimes, e.g. in excess of 20 or 30 years.

In the embodiment shown in FIG. 5 the coil sets are shown to be arranged next to each other. In other embodiments the coil sets may also be arranged around/inside each other or the respective coils of the coil sets may be created by winding a double wire around the same core wherein one wire serves as one of the respective coils and the other wire serves as the other coil. In such configurations the interference between the coil sets is very high and these configurations are thus advantageous if the redundancy concept is of the fail-over type such that one coil set is kept inactive until the active coil set fails.

Stacking the separate coil systems in a longitudinal direction as shown in FIG. 5 has the advantage that the interference of the respective alternating magnetic fields can be kept low and will be lower compared to that of a design in accordance with FIG. 4 because each coil set has a separate flux guide. Still, each of the coil systems will couple its signals to some extent into the other (cross coupling), in particular if the part of the wall extending between the coils is made thinner. This may be used advantageously to create a second received signal, for example to increase the yield in transmitted power or to improve signal transmission. If such is not desired the cross coupling can be suppressed by using different resonance and driving frequencies for the two coil systems.

The subsea housing assembly 100 is described above with respect to the use in a subsea sensor 200, yet it is to be understood that it may also be used in other applications, in particular where the integrity of a pressure barrier is of importance, for example for protecting electric and electronic components. Such applications may include the application in a subsea control unit where the integrity of a one atmospheric chamber needs to be ensured. Other applications are equally conceivable.

While specific embodiments are disclosed herein, various changes and modifications can be made without departing from the scope of the invention. The present embodiments are to be considered in all respects as illustrative and non restrictive, and all changes coming within the meaning and equivalency range of the appended claims are intended to be embraced therein.

The invention claimed is:

1. A subsea housing assembly, comprising:
a subsea housing;
a first housing portion of the subsea housing, wherein the first housing portion comprises a first electrical connection for data communication;
a second housing portion of the subsea housing, wherein the second housing portion comprises a second electrical connection for data communication;

a wall providing separation between the first housing portion and the second housing portion of the subsea housing; and an inductive coupler comprising a first coupling section disposed in the first housing portion and a second coupling section disposed in the second housing portion, wherein the inductive coupler is configured to provide inductive coupling across the wall for providing at least a data communication between the first electrical connection in the first housing portion and the second electrical connection in the second housing portion;

wherein the first coupling section comprises an inner coil and the second coupling section comprises an outer coil, or wherein the first coupling section comprises an outer coil and the second coupling section comprises an inner coil;

wherein the outer coil at least partly surrounds the inner coil; and wherein at least part of the wall extends between the inner coil and the outer coil;

wherein soft magnetic material is arranged at least around the outer coil and/or inside the inner coil such that the magnetic flux is collected and guided from the outer coil to the inner coil and/or from the inner coil to the outer coil; and wherein a support structure is provided around and/or inside the part of the wall extending between the inner coil and the outer coil, wherein the wall and the support structure in combination are configured to provide a pressure barrier to resist a predetermined minimum pressure difference across the wall.

2. The subsea housing assembly according to claim 1, wherein the inductive coupler is further configured to inductively supply electrical power from the electrical connection in the second housing portion to the electrical connection in the first housing portion.

3. The subsea housing assembly according to claim 1, wherein the first housing portion comprises at least a first chamber, wherein the first chamber is a pressure resistant chamber in which a predetermined pressure is maintained when the subsea housing assembly is installed subsea.

4. The subsea housing assembly according to claim 1, wherein the subsea housing is a subsea housing of a subsea electrical device, wherein the first housing portion comprises at least a first chamber, and wherein electric and/or electronic components of the subsea electrical device are disposed in the first chamber.

5. The subsea housing assembly according to claim 1, wherein the second housing portion comprises at least a second chamber, wherein the second chamber is a pressure compensated chamber that is pressure balanced against an ambient pressure.

6. The subsea housing assembly according to claim 5, wherein the second housing portion comprises a pressure compensator providing said pressure compensation, and/or wherein the second housing portion is connected to a subsea cable in form of a medium filled hose, wherein the second chamber is pressure compensated via the medium filled hose.

7. The subsea housing assembly according to claim 1, wherein the wall and the support structure in combination are configured to provide a pressure barrier providing separation between a first chamber in the first housing portion and a second chamber in the second housing portion, wherein the first chamber is a pressure resistant chamber or a pressure compensated chamber, and wherein the second chamber is a pressure resistant chamber or a pressure compensated chamber.

8. The subsea housing assembly according to claim 1, wherein the wall is integrally formed with a first housing body of the first housing portion.

9. The subsea housing assembly according to claim 1, wherein the wall is made of a non-magnetic material.

10. The subsea housing assembly according to claim 1, wherein the support structure comprises an outer body enclosing the outer coil.

11. The subsea housing assembly according to claim 1, wherein the support structure comprises an inner body which is enclosed by the inner coil.

12. The subsea housing assembly according to claim 1, wherein the inner coil, the outer coil, and the support structure are arranged coaxially.

13. The subsea housing assembly according to claim 1, wherein the inductive coupler comprises two sets of first and second coupling sections, wherein the first coupling section of the first set is separated from the first coupling section of the second set by an electromagnetic shielding structure and/or wherein the second coupling section of the first set is separated from the second coupling section of the second set by an electromagnetic shielding structure.

14. A subsea sensor, comprising:
a subsea housing assembly according to claim 1,
wherein the subsea sensor comprises a sensor element disposed in the first housing portion, wherein the first electrical connection is configured for providing communication with the sensor element, and wherein the second electrical connection is configured to provide at least a sensor output of the subsea sensor.

15. The subsea housing assembly according to claim 3, wherein the predetermined pressure comprises a pressure of less than 10 bar.

16. The subsea housing assembly according to claim 8, wherein the first housing body is a single piece metal body.

17. The subsea housing assembly according to claim 5, wherein the pressure compensated chamber is pressure balanced against the seawater pressure when installed subsea.

18. The subsea housing assembly according to claim 9, wherein the wall is made of a non-magnetic metal.

19. The subsea housing assembly according to claim 9, wherein the wall is made of Iconel 625.

20. A housing assembly, comprising:
a housing;
a first housing portion of the housing, wherein the first housing portion comprises a first electrical connection for data communication;
a second housing portion of the housing, wherein the second housing portion comprises a second electrical connection for data communication;
a wall providing separation between the first housing portion and the second housing portion of the housing; and
an inductive coupler comprising a first coupling section disposed in the first housing portion and a second coupling section disposed in the second housing portion, wherein the inductive coupler is configured to provide inductive coupling across the wall for providing at least a data communication between the first electrical connection in the first housing portion and the second electrical connection in the second housing portion;

wherein the first coupling section comprises an inner coil and the second coupling section comprises an outer coil, or wherein the first coupling section comprises an outer coil and the second coupling section comprises an inner coil;

wherein the outer coil at least partly surrounds the inner coil; and wherein at least part of the wall extends between the inner coil and the outer coil;

wherein soft magnetic material is arranged at least around the outer coil and/or inside the inner coil such that the magnetic flux is collected and guided from the outer coil to the inner coil and/or from the inner coil to the outer coil; and wherein a support structure is provided around and/or inside the part of the wall extending between the inner coil and the outer coil, wherein the wall and the support structure in combination are configured to provide a pressure barrier to resist a predetermined minimum pressure difference across the wall.

21. A sensor, comprising:

a housing assembly according to claim 20, wherein the sensor comprises a sensor element disposed in the first housing portion, wherein the first electrical connection is configured for providing communication with the sensor element, and wherein the second electrical connection is configured to provide at least a sensor output of the sensor.

* * * * *